Jan. 2, 1934.   N. W. DORMAN ET AL   1,941,829
CONVEYER
Filed May 9, 1931    6 Sheets-Sheet 1
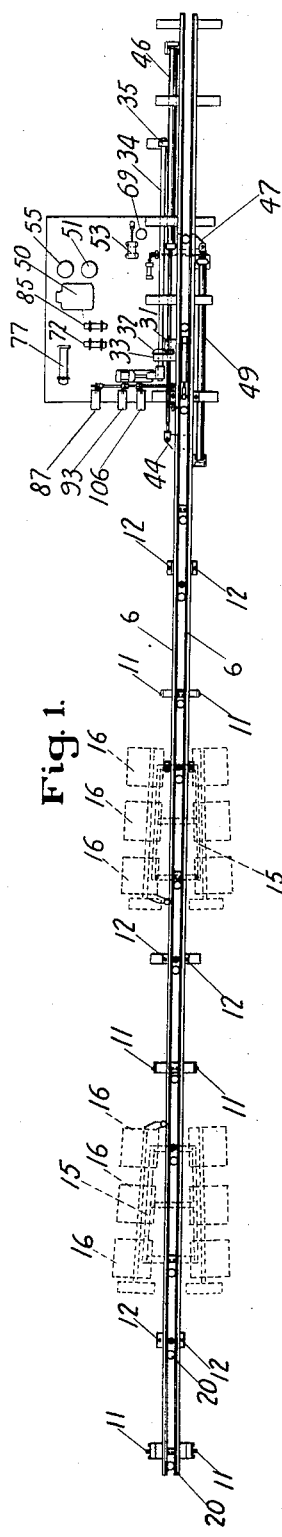
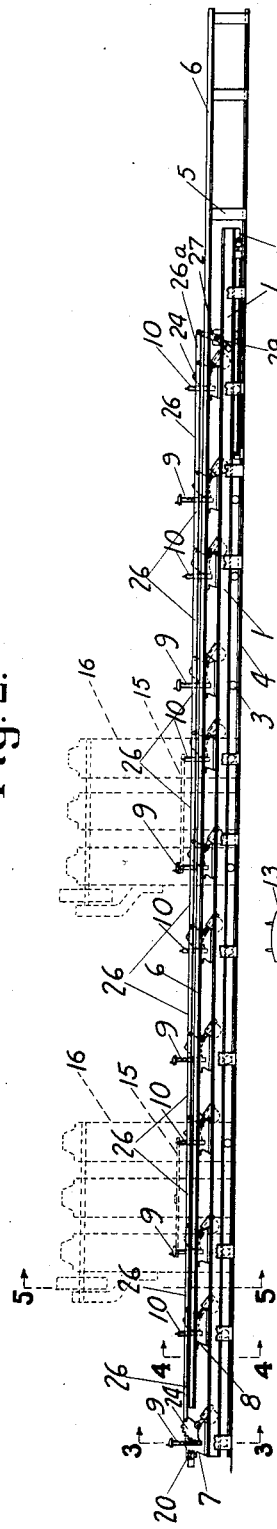
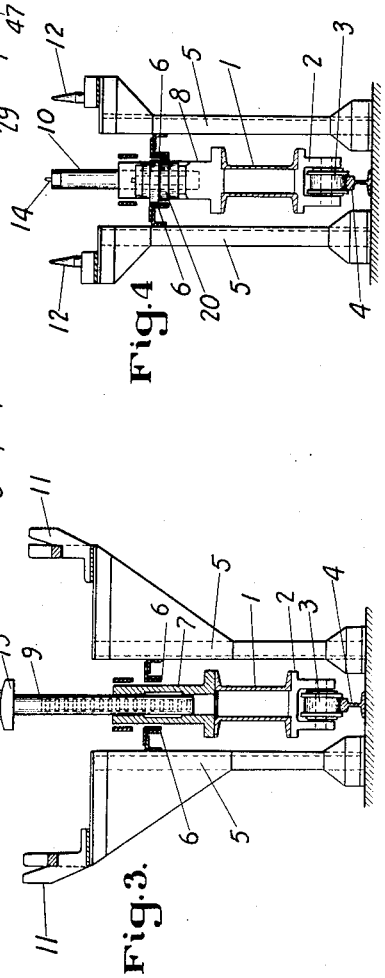
Inventors
Neal W. Dorman
John G. Eisenbach
By Owen & Owen
Attorneys Jan. 2, 1934.   N. W. DORMAN ET AL   1,941,829
CONVEYER
Filed May 9, 1931   6 Sheets-Sheet 3
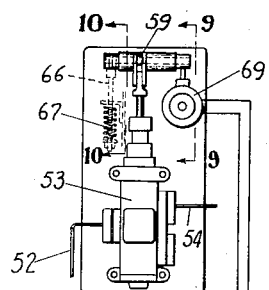
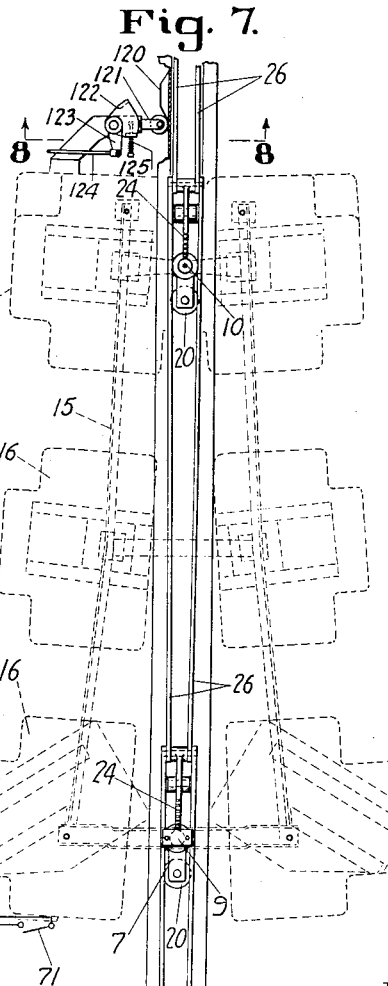
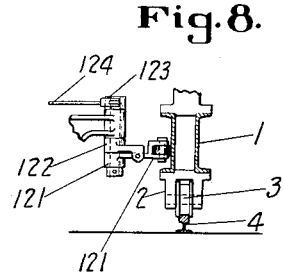
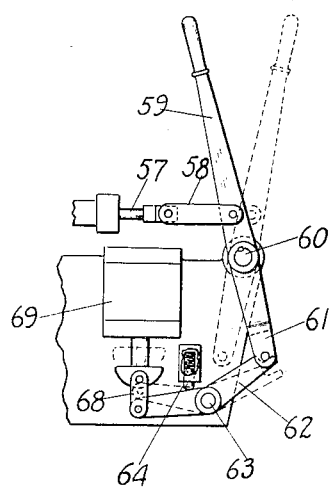
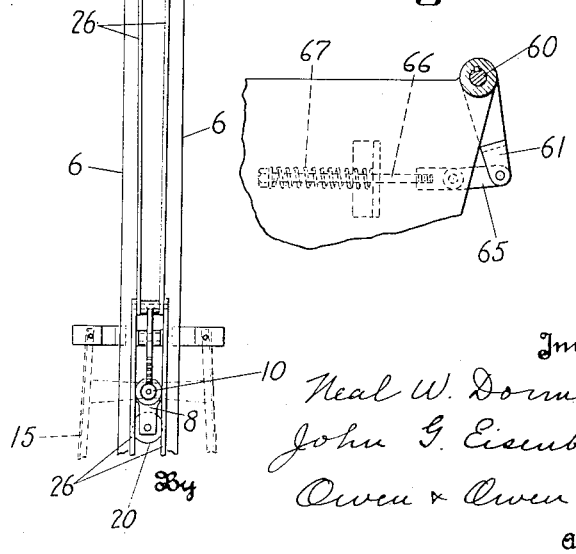
Fig. 7.   Fig. 8.   Fig. 9.   Fig. 10.
Inventors
Neal W. Dorman
John G. Eisenbach
By Owen & Owen
Attorneys Jan. 2, 1934.   N. W. DORMAN ET AL   1,941,829
CONVEYER
Filed May 9, 1931   6 Sheets-Sheet 4

Inventors
Neal W. Dorman
John G. Eisenbach
By Owen & Owen
Attorneys

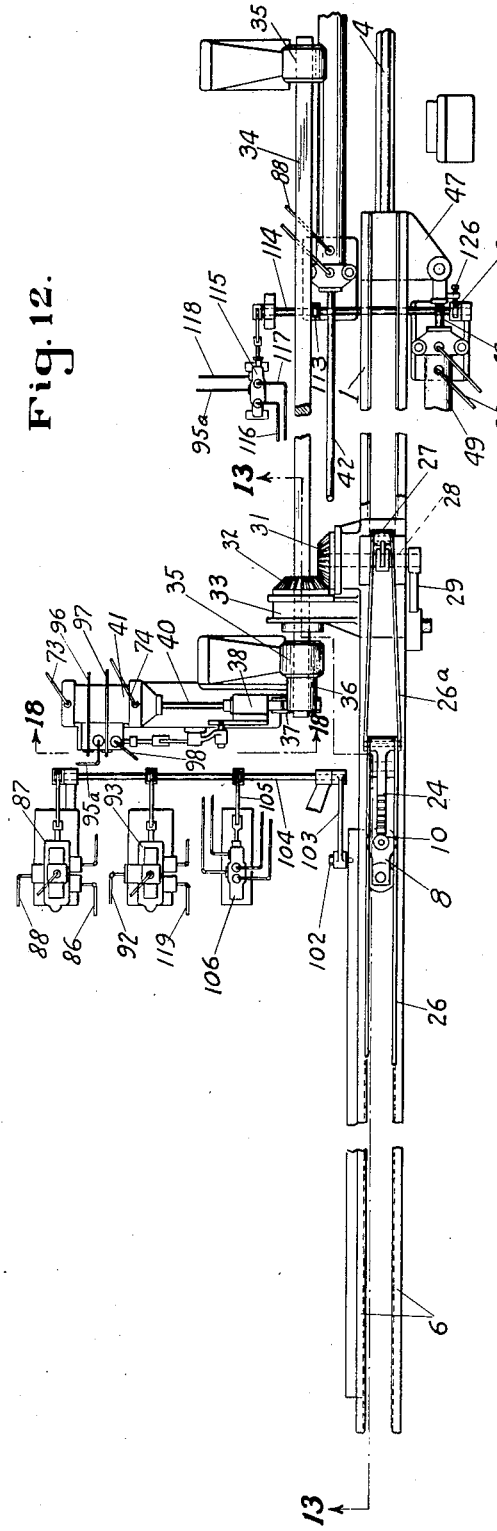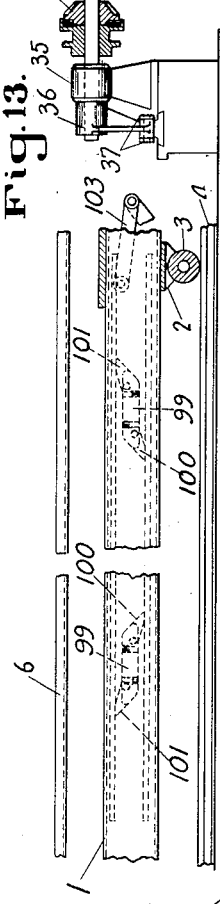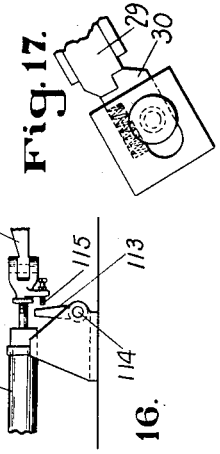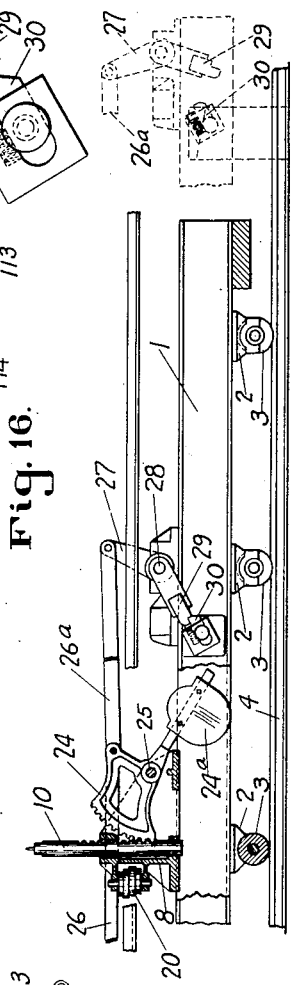

Jan. 2, 1934.    N. W. DORMAN ET AL    1,941,829
CONVEYER
Filed May 9, 1931    6 Sheets-Sheet 6

Inventors
Neal W. Dorman
John G. Eisenbach
By Owen + Owen
Attorneys

Patented Jan. 2, 1934

1,941,829

UNITED STATES PATENT OFFICE 1,941,829

CONVEYER

Neal W. Dorman and John G. Eisenbach, Toledo, Ohio, assignors to The Toledo Machine & Tool Company, Toledo, Ohio, a corporation of Ohio Application May 9, 1931. Serial No. 536,138

7 Claims. (Cl. 78—96)

This invention relates to a conveyer adapted to receive articles successively and to advance them to one or more stations, at each of which one or more machine operations may be performed thereon. In the present embodiment of the invention, for example, an automobile chassis frame may be placed at one end of the conveyer, and by a series of steps, the frame will be picked up and placed at successive stations, at each of which a bank of power presses perform a number of riveting operations in timed relation to the movement of the conveyer.

The general object of the invention is to provide an improved conveyer which can be used in performing the above mentioned operations or other machine operations and which may be controlled automatically, preferably by fluid pressure and in predetermined relation to the operations of the machine or machines with which it is used.

The invention in its present embodiment will be more particularly described in connection with the accompanying drawings, in which—

Figure 1 is a plan view of the conveyer carriage and track and parts adjacent thereto;

Figure 2 is a side elevation of the same;

Figure 3 is an enlarged cross section taken on the line 3—3 of Fig. 2;

Figure 4 is an enlarged cross section taken on the line 4—4 of Fig. 2;

Figure 7 is a plan view of one of the stations, illustrating the means for tripping the machines into operation and showing also the emergency stop control;

Figure 8 is a cross section taken on the line 8—8 of Fig. 7 showing the machine trip mechanism;

Figure 9 is an enlarged sectional view taken on the line 9—9 of Fig. 7 showing the manual control;

Figure 10 is an enlarged sectional view taken on the line 10—10 of Fig. 7;

Figure 12 is a plan view of the jack operating mechanism and the means for controlling various movements of the carriage and jacks;

Figure 13 is a section taken on the line 13—13 of Fig. 12;

Figure 14 is a detail view showing the cams for controlling the deceleration and reversal of the carriage movement;

Figure 15 is a detail view of the means for initiating the downward movement of the jacks;

Figure 16 is a side elevation of the mechanism for raising and lowering the jacks;

Figure 17 is an enlarged detail view of the means for latching the jacks in raised position;

Figure 5:
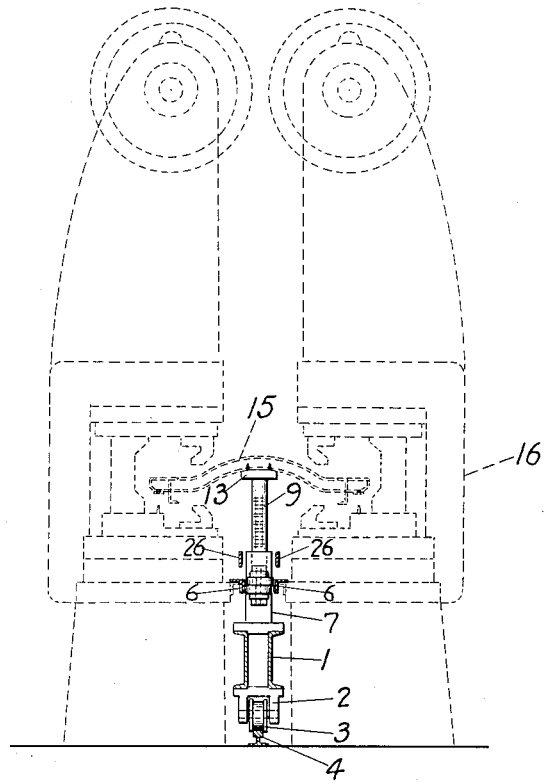
Figure 5 is an enlarged cross section taken on the line 5—5 of Fig. 2 illustrating the jacks with the work-piece thereon in raised position at the first station.
Figure 6:
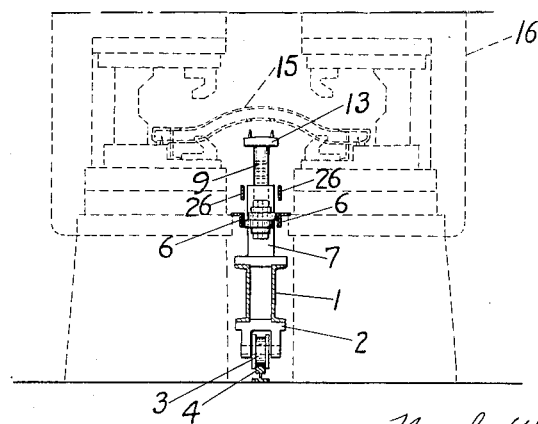
Figure 6 is a view similar to Fig. 5, but with the jack and work-piece lowered.

As illustrated in the drawings the conveyer comprises a carriage 1 which, in the present instance, has spaced longitudinal channel bars mounted on a series of truck frames 2 each of which is supported by a roller 3 on a track 4. At opposite sides of the carriage 1 are fences 5 having side rails 6 on their inner faces between which the carriage is guided as it moves to and fro on the rail 4. On the carriage 1 are secured a succession of keepers 7 and 8 arranged in pairs in which are mounted respectively the rear jacks 9 and the front jacks 10. As shown particularly in Figs. 3 and 4 the fences 5 are provided with seats 11 and 12 arranged at the various stations to receive the work-piece which is delivered thereto by the conveyer. The jacks 9 and 10 are provided with caps 13 and 14 adapted to engage and lift the workpiece from one station and to lower it when it arrives at the next station. In the present instance, the conveyer is adapted to handle successive chassis frames 15 which are successively positioned between banks of power presses 16 which are arranged to perform operations thereon without the intervention of human agency from the time the frame starts from the first station until it is delivered at the last station with all of the operations completed.

Figure 21:
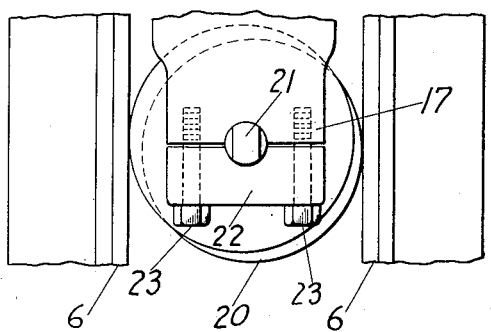
Figure 21 is a plan view of the side rollers of the carriage and means for adjusting the same.
Figure 22:
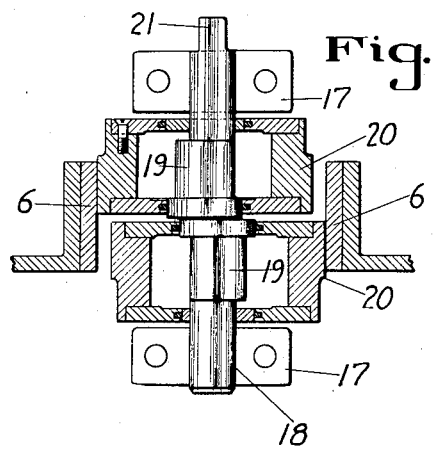
Figure 22 is a vertical section of the parts shown in Fig. 21.

For guiding the carriage smoothly between the side rails 6 as shown in Figs. 21 and 22, certain of the keepers 7 or 8 or some other parts of the carriage are provided with bearings 17 in which shafts 18 are mounted. Each shaft 18 has oppositely arranged eccentric portions 19 on which rollers 20 are journaled. Thus each shaft 18 may be rotatably adjusted by means of a wrench applied to its upper end 21 until the rollers 20 engage the rails 6 without any appreciable play. The shaft 18 is then clamped in adjusted position by caps 22 which are secured by set screws 23.

The jacks 9 and 10 are raised and lowered in unison through the medium of quadrants 24 each of which is fulcrumed as at 25 and provided with a counterweight 24a. The quadrants are connected to each other by links 26 and the foremost quadrant 24 is connected by links 26a to the end of a lever arm 27 which is secured to a shaft 28. A locking arm 29 is also secured to the shaft 28 and has a beveled end which is engaged and held by a spring controlled latch 30 when the jacks complete their upward movement.

The rocking movement of the shaft 28 to raise or lower the jacks is effected through the medium of a beveled gear 31 secured to one end thereof and driven by a bevel gear 32 which is held in mesh therewith by means of a bracket 33 and is mounted to slide longitudinally on a polygonal shaft 34 when the carriage moves longitudinally. The ends of the shaft 34 are journaled in bearings 35 and the shaft is adapted to be rocked by means of a lever arm 36 which is secured thereto and is connected by a link 37 to a slide 38 guided for reciprocatory movement in a guideway 39. The movement of the slide 38 for raising and lowering the jacks is controlled by a piston 40 mounted in a cylinder 41 and actuated by fluid pressure in the manner hereinafter described.

For controlling the longitudinal movement of the carriage, plungers 42 and 43 are located at opposite sides thereof. The plunger 42 is connected to a bracket 44 secured to the carriage and has a head 45 which is caused to move to and fro within a cylinder 46 by means of fluid pressure. Similarly the plunger 43 is connected to a bracket 47 secured to the carriage and has a head 48 which is caused to move to and fro in the cylinder 49 by fluid pressure.

While various ways and means might be devised for effecting the movement of the carriage and of the jacks, the preferred means comprise a fluid pressure system in which the preferred fluid is oil. The pressure for operating the system is shown as supplied from a fluid pressure accumulator 50 including a pump. The fluid passes from the accumulator 50 through a filter 51 to the primary high pressure line 52. The operation of the conveyer is stopped by permitting the fluid to run directly from the line 52 back to the accumulator without going through the system. The path for the return of the fluid when the conveyer is not operating is through a valve 53, line 54, filter 55 and line 56. The position of the valve 53 in open or closed position is controlled through the stem 57 which is connected by a link 58 to a hand lever 59. As shown in Figs. 9 and 10 the lever 59 is fulcrumed on a shaft 60 and has a bifurcated lower end 61. The valve 53 is closed so that the conveyer will operate when the lever 59 is in the position shown in full lines in Fig. 9. The lever is normally held in this position by a dog 62 which is pivoted at 63 and is held in engagement with the lower end 61 of the lever by a spring pressed plunger 64. When the dog 62 is moved to release the lever 59, the latter is immediately thrown to the position shown in dotted lines in Fig. 9 in which position the valve 53 is opened to render the pressure system ineffective for operating the conveyer. This movement of the lever 59 to stop the conveyer is effected, as shown in Fig. 10, through a link 65 which connects the lower end 61 of the lever to a rod 66 which is acted upon by the pressure of a spring 67. Thus the stopping of the conveyer is adapted for remote control through the medium of a link 68 which connects one end of the dog 62 to the core of a solenoid 69. The circuit 70 controlling the solenoid may of course be carried to any point along the side of the conveyer track and may be provided with one or more switches 71 as shown in Fig. 9. Thus the conveyer and all of the other mechanism may be stopped at any time from any point where a switch 71 is located.

Assuming that the conveyer is at rest with the carriage in its rearmost position with the jacks lowered, and that the starting lever 59 is moved to starting position, the valve 53 will be closed and the fluid will flow from the high pressure line 52 through the valve 72 and line 73 into the rear end of the cylinder 41 to advance the plunger 40, thereby rocking the shaft 34 to raise the jacks 9 and 10. During this movement the fluid from the front end of the cylinder 41 is drained through line 74, valve 72, lines 75 and 76, cooling unit 77 and return line 78 back to the accumulator 50.

Figure 18:
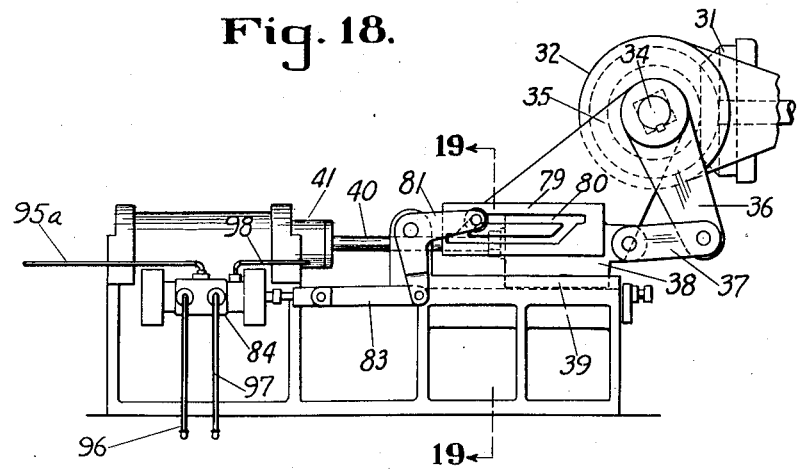
Figure 18 is an enlarged section taken on the line 18—18 of Fig. 12 showing the mechanism for shifting the valves to initiate the longitudinal movement of the carriage.
Figure 19:
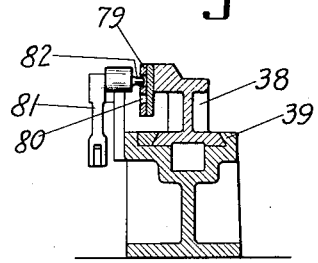
Figure 19 is a section taken on the line 19—19 of Fig. 18.
Figure 20:
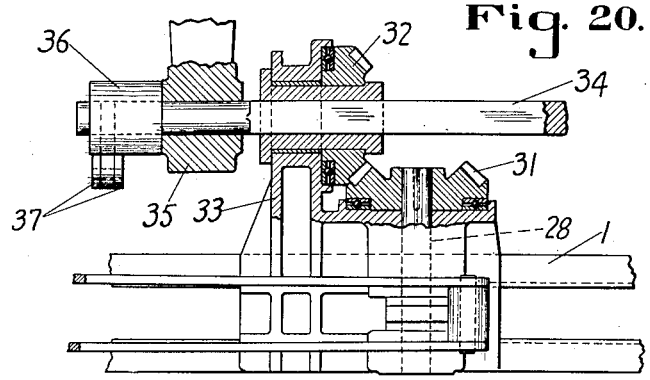
Figure 20 is a horizontal sectional view of the gearing for raising and lowering the jacks.

As shown in Figs. 18 and 19, the slide 38, which is secured to the plunger 40, carries a cam plate 79 having a cam track 80. A bell crank 81 mounted at one side of the slide 38 has a wrist pin 82 which follows the track 80 as the slide is reciprocated. The other end of the bell crank 81 is connected by a link 83 to a valve 84, which is shifted by the movement of the bell crank as it follows the track 80, to initiate the longitudinal movement of the carriage at the completion of the upward movement of the jacks. As soon as the valve 84 is thus shifted, fluid passes from the pressure accumulator through lines 95 and 95a, valve 84 and line 96 to one end of the valve 85 to shift the latter while fluid is drained from the other end of valve 85 through line 97, valve 84 and lines 98, 91 and 90. After valve 85 is thus shifted, fluid for effecting the forward movement of the carriage passes from the high pressure line 52 through valve 85, line 86, valve 87 and line 88 to the left hand end of the cylinder 46, while the right hand end of the cylinder 46 is drained through the line 89, which is connected by line 90 to the low pressure side of the accumulator. During this forward movement of the carriage, fluid will flow through line 91 to the left hand end of the cylinder 49 and will be drained from the right hand end of the cylinder 49 through line 92, valve 93 and line 94.

As the carriage approaches the end of its longitudinal movement, a cam 99 with spring held noses 100 and 101 (Figs. 13 and 14) engages a wrist pin 102 on the end of an arm 103 secured to a rock shaft 104. The rocking of the shaft 104, through the medium of a link 105, opens the speed control valve 106. Fluid then passes from the high pressure line 52 through line 107, valve 106 and line 108 to the speed control unit 109, shifting the latter to reduce the speed of travel of the carriage. The unit 109 is drained through line 110, valve 106 and line 111. It is to be understood that there are two cams 99, one to rock the shaft 104 at the beginning of its movement in either direction and the other to rock said shaft toward the end of its movement. Each cam 99 toward the end of the longitudinal movement of the carriage rocks the shaft 104 in one direction to open the valve 106 and during the first part of the return movement of the carriage rocks said shaft in the opposite direction to close the valve 106 and speed up the movement.

The rocking of the shaft 104 toward the end of the forward movement of the carriage finally shifts the valve 87 to cut off the pressure from the line 88 and put the latter into communication with the drain line 94. At the same time the valve 93 is shifted to connect the line 92 to the line 119 leading from the valve 85.

Figure 11:
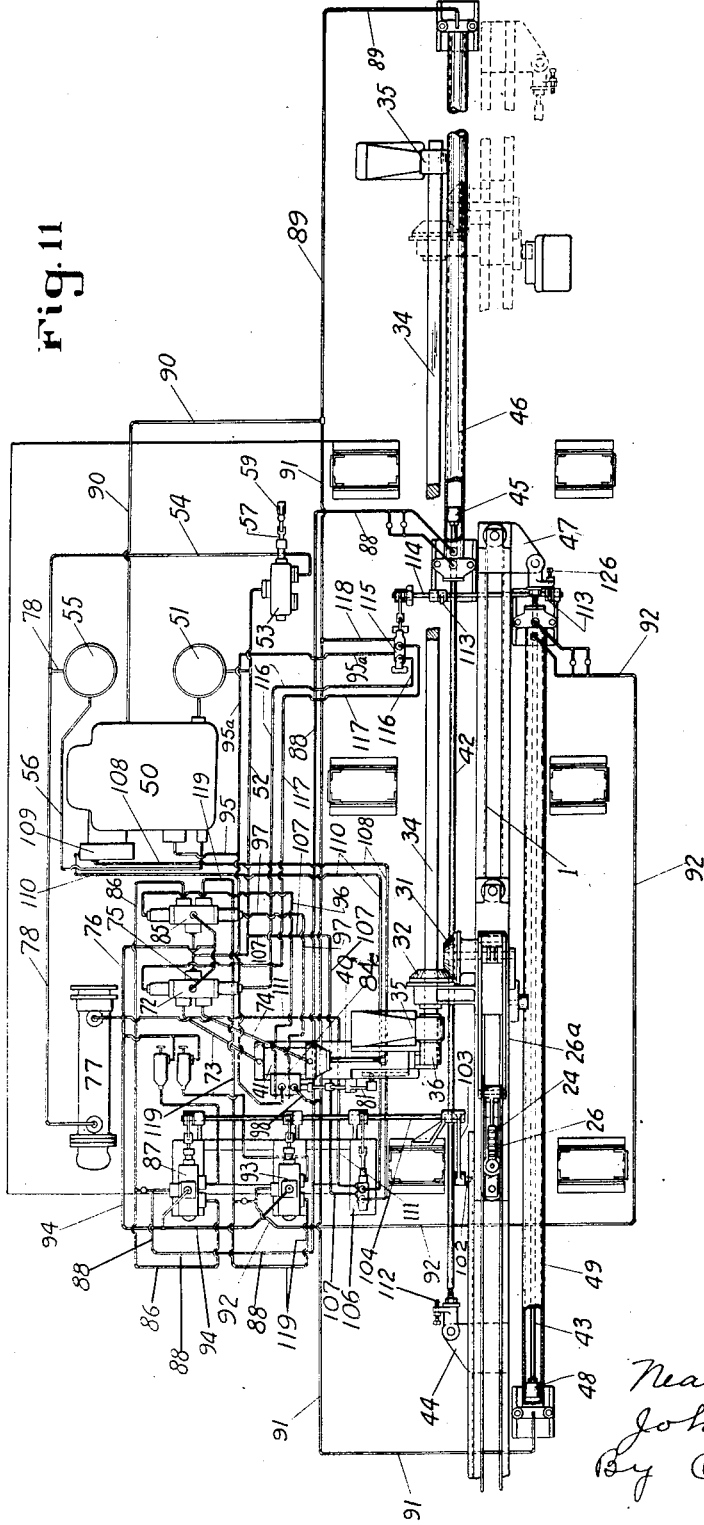
Figure 11 is a plan view of the fluid pressure control layout.

As the carriage reaches the limit of its forward movement, an adjustable stop 112 at the rear end of piston 42 (Fig. 11) engages an arm 113 on the rock shaft 114 to rock the latter. There is also a similar stop 126 (Fig. 15) at the front end of the piston 43 for engaging the arm 113 at the completion of the rearward movement of the carriage. The rocking of the shaft 114 at the end of the forward movement shifts the valve 115, so that fluid follows from the lines 95 and 95a through valve 115 and line 116 to one end of valve 72 to shift the latter. Fluid from the other end of valve 72 is drained through line 117, valve 115 and lines 118, 91 and 90.

After the valve 72 is thus shifted, fluid follows from the high pressure line 52 through valve 72 and line 74 into the front end of the cylinder 41 to retract the piston 40 and lower the jacks. During this movement, the rear end of the cylinder 41 is drained through line 73, valve 72 and line 75.

As soon as the jacks are lowered, the cam track 80 has been moved back to rock the bell crank 81 and shift the valve 84. Thereupon fluid flows through lines 95 and 95a, valve 84 and line 97 to one end of the valve 85 to shift it. The other end of the valve 85 is drained through line 96.

Fluid now follows from the high pressure line 52 through valve 85, line 119, valve 93 and line 92 to the right hand end of cylinder 49 to move the carriage rearwardly. During this rearward movement, drainage from the left hand end of cylinder 49 is through line 91, which is connected to line 90. At the same time, fluid passes through line 89 into the right hand end of cylinder 46 and is drained from the left hand end of cylinder 46 through line 88, valve 87 and line 94.

Shortly after the rearward movement of the carriage is begun, a cam 120 on the carriage (Figs. 7 and 8) rocks an arm 121 rearwardly. This rocks a keeper 122 to which a lever arm 123 is secured. The lever arm 123 moves a trip rod 124 to start the operation of the machines 16. The arm 121 is yieldingly held by a spring 125, so that it passes over the cam 120 during the forward movement of the carriage without moving the keeper 122. The operation of the machines 16 is so timed that it will be completed and the machines will come to rest before the carriage completes its rearward travel.

As the carriage approaches its rearmost position, the slowing down and stopping of its movements are effected in the same manner as at the end of its forward movement. At this time the stop 126 engages the arm 113 to rock the shaft 114, thereby shifting the valve 115 and consequently the valve 72 to start the conveyer on its next operating cycle.

From the foregoing description, it will be understood that the conveyer operates continuously and the machines operate in synchronism therewith. Each step in the operation follows the preceding step automatically and as the conveyer completes one cycle, it automatically starts on the succeeding cycle. While we have shown and described with considerable detail the present embodiment of the invention, it is apparent that the same may be modified in a great many respects without departing materially from the scope of the invention as claimed.

What we claim is:

1. In combination, a carriage mounted for reciprocation in a substantially horizontal direction, jacks mounted for movement up and down on the carriage, a rock shaft, means operatively connecting said rock shaft to the jacks to raise and lower the latter, said means being slidable with reference to the rock shaft as the carriage is reciprocated, means for rocking said shaft, and means rendered effective by the shaft rocking means to move the carriage first in one direction and then in the opposite direction as the rock shaft completes its respective rocking movements.

2. In combination, a carriage mounted for reciprocation in a substantially horizontal direction, jacks mounted for movement up and down on the carriage, a rock shaft, means operatively connecting said rock shaft to the jacks to raise and lower the latter, said means being slidable with reference to the rock shaft as the carriage is reciprocated, means including a piston reciprocable by fluid pressure to rock said shaft, a valve, and means carried by said piston to actuate said valve to cause fluid pressure to move the carriage first in one direction and then in the opposite direction as the rock shaft completes its respective rocking movements.

3. In combination, a carriage mounted for reciprocation in a substantially horizontal direction, jacks mounted on the carriage, means for controlling the movement of the jacks up and down, means actuated by the jack controlling means as the upward movement of the jacks is completed, to advance the carriage, means actuated by the carriage at the conclusion of its advance to lower the jacks, means actuated by the jack controlling means, as the lowering of the jacks is completed, to return the carriage, and means actuated by the carriage as it reaches its initial position to start another cycle of operation.

4. In combination, a carriage mounted for reciprocation in a substantially horizontal direction, jacks mounted on the carriage, means operable by fluid pressure for controlling movement of the jacks up and down, means including a cylinder and piston actuated by the jack controlling means as the upward movement of the jacks is completed, to advance the carriage, means actuated by the carriage at the conclusion of its advance to lower the jacks, means actuated by the jack controlling means as the lowering of the jacks is completed, to initiate a reverse action of the carriage controlling means to return the carriage to its initial position, and means actuated by the carriage as it completes its return movement to start another cycle of operation.

5. In combination, a carriage mounted for reciprocation in a substantially horizontal direction, jacks mounted for movement up and down on the carriage, a rock shaft, means operatively connecting said rock shaft to the jacks to raise and lower the latter, said means being slidable with reference to the rock shaft as the carriage is reciprocated, means for rocking said shaft, means rendered effective by the shaft rocking means to move the carriage first in one direction and then in the opposite direction as the rock shaft completes its respective rocking movements, and means for supporting an article in position to be picked up by the jacks when they are raised and to remove the article from the jacks when the jacks are lowered.

6. The combination with a carriage, of means for intermittently moving the carriage a predetermined distance first in one direction and then in the opposite direction, and a series of lifting devices on the carriage for lifting an article while the carriage is in rearmost position and for depositing said article while the carriage is in foremost position, one such device being arranged to deposit the article at a predetermined station and another such device arranged to advance it from such station on the next operating cycle.

7. The combination with a carriage, of means operable by fluid pressure for intermittently moving the carriage a predetermined distance first in one direction and then in the opposite direction, a series of lifting devices on the carriage and operable by fluid pressure for lifting an article while the carriage is in rearmost position and for depositing said article while the carriage is in foremost position, one such device being arranged to deposit the article at a predetermined station and another such device arranged to advance it from such station on the next operating cycle, and means automatically controlling the fluid pressure for effecting the movements of the carriage and lifting devices in the sequence stated.

NEAL W. DORMAN.
JOHN G. EISENBACH.